R. A. FESSENDEN.
SUBMARINE SIGNALING.
APPLICATION FILED FEB. 28, 1917.

1,318,739.

Patented Oct. 14, 1919.

INVENTOR=
Reginald A. Fessenden
By
HIS ATTORNEYS=

UNITED STATES PATENT OFFICE.

REGINALD A. FESSENDEN, OF BROOKLINE, MASSACHUSETTS, ASSIGNOR TO SUBMARINE SIGNAL COMPANY, OF PORTLAND, MAINE, A CORPORATION OF MAINE.

SUBMARINE SIGNALING.

1,318,739.

Specification of Letters Patent.    Patented Oct. 14, 1919.

Application filed February 28, 1917. Serial No. 151,610.

*To all whom it may concern:*

Be it known that I, REGINALD A. FESSENDEN, of Brookline, in the county of Norfolk and State of Massachusetts, a citizen of the United States, have invented a new and useful Improvement in Submarine Signaling, of which the following is a specification.

The object of this invention is to increase the efficiency of submarine signaling apparatus, and more especially to increase the sensibility of sound producers and receivers in which a diaphragm or other vibratory member immersed in water, is used for the transmission or reception of the sounds.

I have found experimentally that where sounds are produced by the motion of a vibratory member under water, or where the received sounds strike upon and move such a member, the efficiency of the transmission and reception of the sounds may be very greatly improved by placing the member under a definite initial balanced pressure. For example, when an oscillator of the type shown in U. S. Patent No. 1,167,366, dated January 4, 1916, is arranged to operate a diaphragm for submarine signaling, the diaphragm is usually about twenty to thirty feet below the surface of the water, and hence under considerable water pressure. By putting pressure on the diaphragm so as to force it either outward or inward, the amount and direction of pressure being determined experimentally for each case, the efficiency of the apparatus for the receipt of signals is increased several times, and the efficiency for transmission to a somewhat less amount. I have shown my invention in connection with the diaphragm of such an oscillator, although it may be otherwise embodied.

Figure 1:
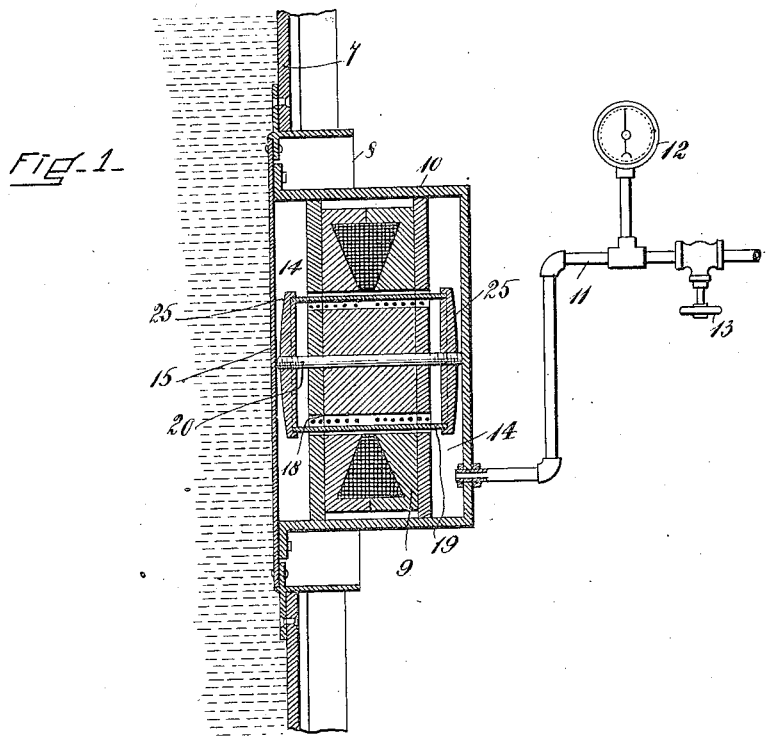
Figure 2:
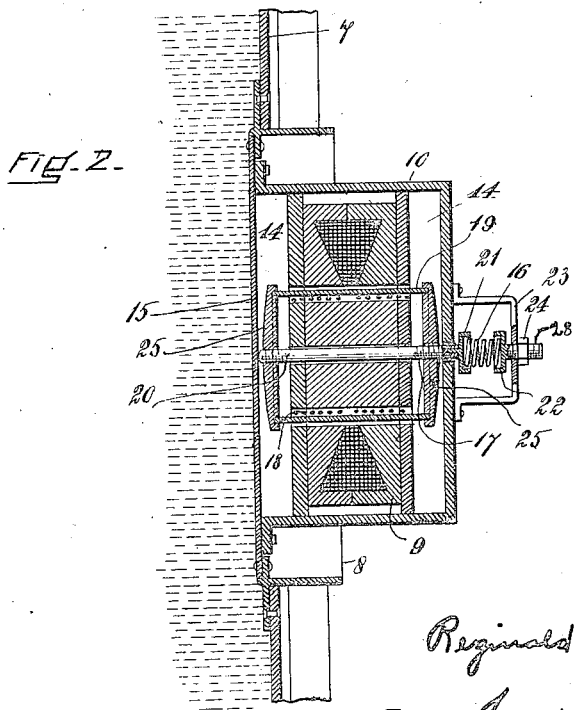

Figures 1 and 2 are cross sections illustrating constructions for carrying out my invention.

10 is a casing within which the oscillator 9 is mounted, the front end of the casing being closed in by the diaphragm 15 to which it is attached. The diaphragm 15 is attached to a mounting 8 which is set into an opening in the skin 7 of the ship so that the mounting and diaphragm form a watertight joint, while the diaphragm is exposed to the outside water pressure.

The tube 19 is held between disks 25 which are clamped together by the rod 20, which is threaded at each end for the purpose.

In the form of my invention shown in Fig. 1 the chamber 14 within the casing 10 is connected by a pipe 11 with a source of compressed fluid, for example, air, pressure being applied through the pipe from a suitable source until the sensitiveness of the diaphragm 15 is at a maximum whereupon the reading is taken at the gage 12, which is connected with the pipe 11, and the cock 13 in the pipe 11 is closed.

When the gage shows that the pressure has lowered it may be brought back again on opening the cock 13, connecting the casing again with the source of pressure.

The air passing through the air gap 18 in which the copper tube 19 moves, fills the chamber 14, pressing the diaphragm 15 forward the desired amount against the water pressure from without.

In Fig. 2 in place of air pressure the central or driving rod 20 of the oscillator is extended out through the casing 10 and terminates in a cup 21, which holds one end of the spring 16, the other end of which is set into the reversed cup 22 on the end of a threaded rod 28, which is screwed through a strap 23 attached to the casing and is held by a set nut 24.

In this case the spring 16 is adjusted so as to press the rod 20 against the diaphragm 15 and hold it in proper position for its maximum sensitiveness, the spring 16 allowing it to have the proper vibration.

Other means for accomplishing this result will occur to those skilled in the art. Moreover, my invention is applicable to other devices comprising a vibratory member which is normally subject to abnormal pressure on one side thereof, and means for vibrating it.

While sound senders and receivers of sound have been suspended in water ballast tanks or tanks filled with liquid and attached to the side of a ship, the liquid in such cases is used merely as a vehicle in which to originate the compressional waves so that they will pass from the sounder into the outside water with the least possible loss of efficiency. My present invention consists in placing the liquid or fluid which is in touch with the diaphragm under such pressure as will get the greatest efficiency from the diaphragm.

What I claim as my invention is:—

1. An apparatus for submarine signaling comprising a diaphragm one face of which is under immersion pressure depending upon the depth to which it is submerged and means for placing and maintaining the other face of said diaphragm under a constant predetermined abnormal pressure independent of said immersion pressure and means for causing the vibration of said diaphragm.

2. An apparatus for submarine signaling comprising a diaphragm one face of which is under immersion pressure depending upon the depth to which it is submerged and means for placing and maintaining the other face of said diaphragm under a constant predetermined abnormal pressure independent of said immersion pressure and means engaging said diaphragm to vibrate it.

REGINALD A. FESSENDEN.